US009747153B2

(12) United States Patent
Raghavendra et al.

(10) Patent No.: US 9,747,153 B2
(45) Date of Patent: Aug. 29, 2017

(54) RESILIENCE AS A SERVICE

(71) Applicant: Microsoft Technology Licensing, LLC., Redmond, WA (US)

(72) Inventors: Chetan Pentam Raghavendra, Kirkland, WA (US); Dmitri A. Klementiev, Redmond, WA (US); Varun Jain, Redmond, WA (US); Michail Zervos, Bellevue, WA (US); Dhruv Gakkhar, Bellevue, WA (US); Satya Sudha Kolluru, Sammamish, WA (US); Lenina Devi Thangavel, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 9 days.

(21) Appl. No.: 14/745,756

(22) Filed: Jun. 22, 2015

(65) Prior Publication Data
US 2016/0371134 A1  Dec. 22, 2016

(51) Int. Cl.
*G06F 11/07* (2006.01)
*G06F 11/30* (2006.01)
*H04L 12/24* (2006.01)

(52) U.S. Cl.
CPC ........ *G06F 11/079* (2013.01); *G06F 11/0721* (2013.01); *G06F 11/3055* (2013.01); *H04L 41/5038* (2013.01); *H04L 41/5058* (2013.01)

(58) Field of Classification Search
CPC ............. G06F 11/3006; G06F 11/3447; G06F 11/3452; G06F 11/0709; G06F 11/0793;
(Continued)

(56) References Cited

U.S. PATENT DOCUMENTS

| 6,336,138 B1* | 1/2002 | Caswell | H04L 41/12 345/440 |
|---|---|---|---|
| 2004/0046785 A1* | 3/2004 | Keller | G06F 9/5061 715/734 |

(Continued)

OTHER PUBLICATIONS

International Search Report & Written Opinion Issued in counterpart PCT Application No. PCT/US2016/037951, Mailed Date: Aug. 5, 2016, 12 Pages.

(Continued)

*Primary Examiner* — Nadeem Iqbal
(74) *Attorney, Agent, or Firm* — Harness, Dickey & Pierce, P.L.C.

(57) ABSTRACT

Systems and methods disclosed herein are directed to creating a service directory of dependencies for services running on a system, wherein instances of a first service are dependent upon instances of a second service. The directory of dependencies comprises metadata associated with connections between the services. The system injects faults targeting all levels of the dependencies. The system is monitored to detect failures created by the faults. The injected faults are selected from transport layer faults, memory pressure, processor pressure, storage pressure, virtual machine restart, and virtual machine shut down. A domain name service is monitored to identify names that are resolved for the services. The service directory is then updated continuously with additional dependencies using information about the resolved names. The faults may be injected in a guided manner, wherein the scope of the faults is increased in steps over time to identify a failure point in the system.

20 Claims, 4 Drawing Sheets

(58) Field of Classification Search
CPC .......... G06F 11/2289; G06F 11/2294; H04L 43/065; H04L 43/08; H04L 43/10; H04L 43/50
See application file for complete search history.

(56) References Cited

U.S. PATENT DOCUMENTS

| | | | |
|---|---|---|---|
| 2004/0049372 A1* | 3/2004 | Keller | H04L 41/06 703/22 |
| 2012/0072571 A1* | 3/2012 | Orzell | G06F 11/008 709/224 |
| 2012/0297054 A1* | 11/2012 | Breiter | G06F 11/3006 709/224 |
| 2013/0275518 A1* | 10/2013 | Tseitlin | G06F 11/36 709/206 |
| 2014/0281739 A1* | 9/2014 | Tuffs | G06F 11/3452 714/47.2 |
| 2014/0337674 A1* | 11/2014 | Ivancic | H04L 43/50 714/43 |
| 2015/0089274 A1 | 3/2015 | Mares et al. | |

OTHER PUBLICATIONS

Zhai, et al., "Auditing the Structural Reliability of the Cloud", In Technical Report YALEU/DCS/TR-1479, Jul. 2013, (28 pages).
Christensen, Ben, "Fault Tolerance in a High Volume, Distributed System", Published on: Feb. 29, 2012 Available at: http://techblog.netflix.com/2012/02/fault-tolerance-in-high-volume.html, (8 pages).
Gregg, Brendan, "Netflix: From Clouds to Roots", Published on: Sep. 25, 2014 Available at: http://www.slideshare.net/brendangregg/netflix-from-clouds-to-roots, (22 pages).
Nita, et al., "FIM-SIM: Fault Injection Module for CloudSim Based on Statistical Distributions", Journal of Telecommunications and Information Technology, vol. 2014, Issue 4, Dec. 2014, pp. 14-23.
Nguyen, Hiep, et al., "FChain: Toward Black-box Online Fault Localization for Cloud Systems", Proceedings of 2013 IEEE 33rd International Conference on Distributed Computing Systems, Jul. 8, 2013, pp. 21-30.
"Netflix: Continually Test by Failing Servers with Chaos Monkey", Published on: Dec. 28, 2010 Available at: http://highscalability.com/blog/2010/12/28/netflix-continually-test-by-failing-servers-with-chaos-monke.html (7 pages).
Simone, Luigi DE., "Towards Fault Propagation Analysis in Cloud Computing Ecosystems", Proceedings of 2014 IEEE International Symposium on Software Reliability Engineering Workshops, Nov. 3, 2014, pp. 156-161.
Stewart, Robert., "Reliable Massively Parallel Symbolic Computing: Fault Tolerance for a Distributed Haskell", PhD thesis, Nov. 2013, (226 pages).
Faghri, Faraz, et al., "Failure Scenario as a Service (FSaaS) for Hadoop Clusters", Proceedings of the Workshop on Secure and Dependable Middleware for Cloud Monitoring and Management, Dec. 3, 2012, (6 pages).
Ju, Xiaoen, et al., "Towards a Fault-Resilient Cloud Management Stack", Proceedings of 5th USENIX Workshop on Hot Topics in Cloud Computing, Jun. 25, 2013, (5 pages).
Izrailevsky, Yury, et al., "The Netflix Simian Army", Published on: Jul. 19, 2011, Available at: http://techblog.netflix.com/2011/07/netflix-simian-army.html (6 pages).
"International Preliminary Report on Patentability Issued in PCT Application No. PCT/US2016/037951", dated May 26, 2017, 6 Pages.

* cited by examiner

RESILIENCE AS A SERVICE

BACKGROUND

It is now common for a large variety of software applications to run as services on cloud platforms comprising a distributed network of servers or on an on-premises enterprise datacenter. It is a requirement for these services to maintain a high availability to customers and tenants. Satisfying this requirement is a complex problem due to the distributed nature of cloud-based applications and the non-trivial inter-dependencies of the services' components on each other.

A common approach for testing the availability of services in a datacenter is to manually create fault models for a service and then analyze the impact of various component failures. This approach has several drawbacks. Creating accurate fault models takes time and becomes prohibitively expensive if the functionality, architecture, and/or dependencies change often. When many factors affect functioning of a complex, distributed system, then manually created fault models are likely to miss many combinations of such factors. Human error and a lack of knowledge of all the dependencies for each component is likely to result in important failures having high customer impact from being included in the fault models. Additionally, independently created fault models for different components that are not updated often enough may not detect new dependencies between separate services and will likely miss many failure scenarios.

Accordingly, the rapid development and deployment of modern software wherein new dependencies are unknowingly added and removed makes the above-mentioned approach unpractical.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Fault injection methods for existing systems use brute force and coarse grain processes that are focused on failing the machine under test. However, in the real world, faults are not all Boolean in nature (i.e., faults are more complex that whether a component is running or failed). Transient and degraded faults cannot be tested or evaluated by merely failing selected components. Embodiments disclosed herein provide targeted, precise fault injection that allows for the automatic introduction of real-world transient degradation.

Embodiments provide systems and methods that allow developers and service providers to have an exact graph or mapping of the dependencies among components of a service at any given moment of time, to know type of the dependencies, and to know the impact that failed components may have on customers using the service.

Systems and methods disclosed herein are directed to creating a service directory of dependencies for services running on a system, wherein instances of a first service are dependent upon instances of a second service. The directory of dependencies comprises metadata associated with connections between the services. The system injects faults targeting all levels of the dependencies. The system is monitored to detect failures created by the faults. The injected faults are selected from a limited set of faults comprising transport layer faults, memory pressure, processor pressure, storage pressure, virtual machine restart, and virtual machine shut down. A domain name service is monitored to identify names that are resolved for the services. The service directory is then updated continuously with additional dependencies using information about the resolved names. The faults may be injected in a guided manner, wherein the scope of the faults is increased in steps over time to identify a failure point in the system.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
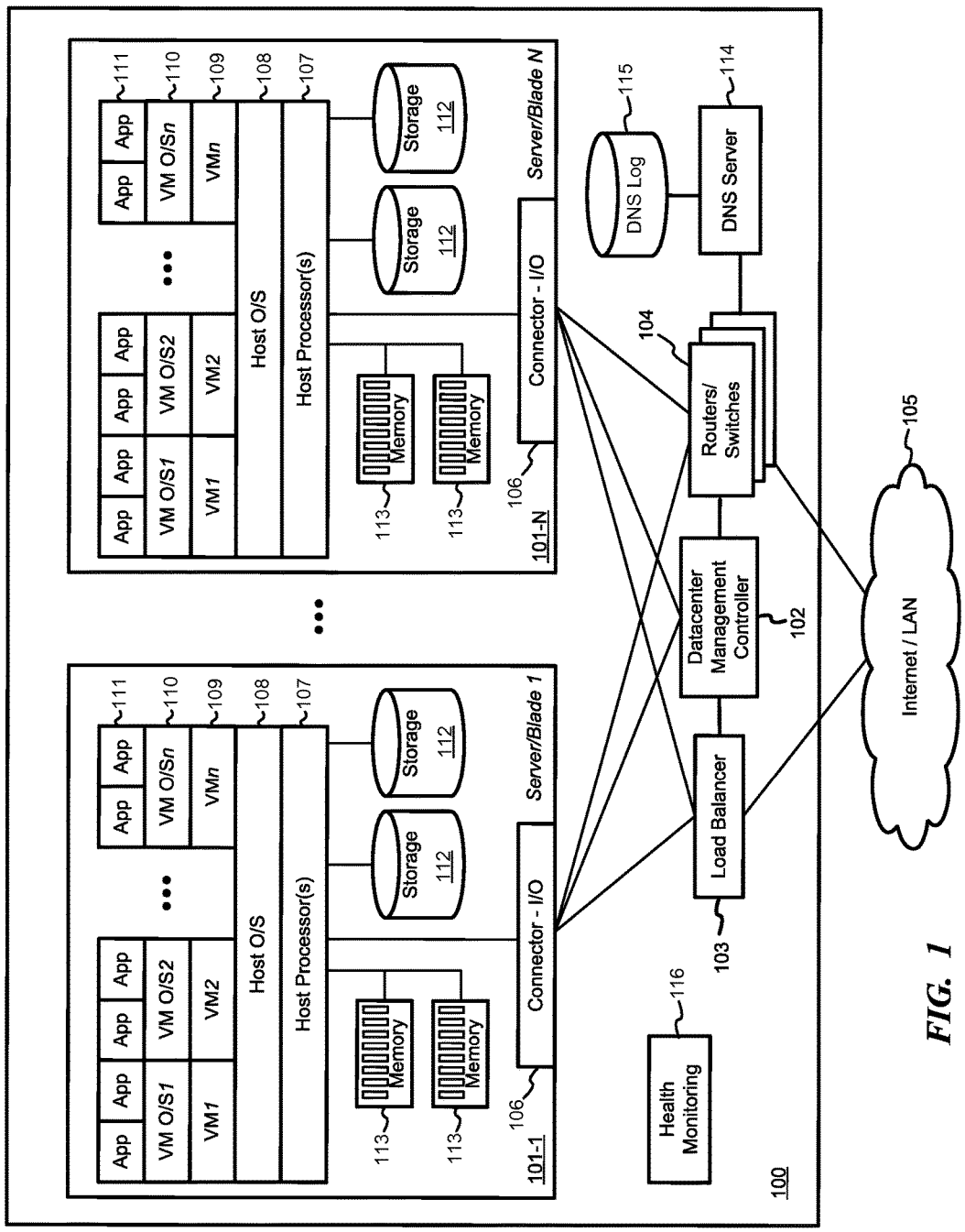
FIG. 1 is a high level block diagram of an example datacenter 100 that provides cloud computing services or distributed computing services.

FIG. 1 is a high level block diagram of an example datacenter 100 that provides cloud computing services or distributed computing services. A plurality of servers 101 are managed by datacenter management controller 102. Load balancer 103 distributes requests and workloads over servers 101 to avoid a situation where a single server becomes overwhelmed and to maximize available capacity and performance of the resources in datacenter 100. Routers/switches 104 support data traffic between servers 101 and between datacenter 100 and external resources and users via an external network 105, which may be, for example, a local area network (LAN) or the Internet.

Servers 101 may be standalone computing devices and/or they may be configured as individual blades in a rack of many server devices. Servers 101 have an input/output (I/O) connector 106 that manages communication with other database entities. One or more host processors 107 on each server 101 run a host operating system (O/S) 108 that supports multiple virtual machines (VM) 109. Each VM 109 may run its own O/S so that each VM O/S 110 on a server is different, or the same, or a mix of both. The VM O/S's 110 may be, for example, different versions of the same O/S (e.g., different VMs running different current and legacy versions of the Windows® operating system). In addition, or alternatively, the VM O/S's 110 may be provided by different manufacturers (e.g., some VMs running the Windows® operating system, while others VMs run the Linux® operating system). Each VM 109 may then run one or more applications (App) 111. Each server 101 also includes storage 112 (e.g., hard disk drives (HDD)) and memory 113 (e.g., RAM) that can be accessed and used by the host processors 107 and VMs 109.

Datacenter 100 provides pooled resources on which customers or tenants can dynamically provision and scale applications as needed without having to add more servers or additional networking. This allows tenants to obtain the computing resources they need without having to procure, provision, and manage infrastructure on a per-application, ad-hoc basis. A cloud computing datacenter 100 allows tenants to scale up or scale down resources dynamically to meet the current needs of their business. Additionally, a datacenter operator can provide usage-based services to tenants so that they pay for only the resources they use, when they need to use them. For example, a tenant may initially use one VM 109 on server 101-1 to run their applications 111. When demand increases, the datacenter 100 may activate additional VMs 109 on the same server 101-1 and/or on a new server 101-N as needed. These additional VMs 109 can be deactivated if demand later drops.

Datacenter 100 may offer guaranteed availability, disaster recovery, and back-up services. For example, the datacenter may designate one VM 109 on server 101-1 as the primary location for the tenant's application and may activate a second VM 109 on the same or different server as a standby or back-up in case the first VM or server 101-1 fails. Database manager 102 automatically shifts incoming user requests from the primary VM to the back-up VM without requiring tenant intervention. Although datacenter 100 is illustrated as a single location, it will be understood that servers 101 may be distributed to multiple locations across the globe to provide additional redundancy and disaster recovery capabilities. Additionally, datacenter 100 may be an on-premises, private system that provides services to a single enterprise user or may be a publically accessible, distributed system that provides services to multiple, unrelated customers and tenants or may be a combination of both.

Domain Name System (DNS) server 114 resolves domain and host names into IP addresses for all roles, applications, and services in datacenter 100. DNS log 115 maintains a record of which domain names have been resolved by role. It will be understood that DNS is used herein as an example and that other name resolution services and domain name logging services may be used to identify dependencies. For example, in other embodiments, IP or packet sniffing, code instrumentation, or code tracing.

Datacenter health monitoring 116 monitors the health of the physical systems, software, and environment in datacenter 100. Health monitoring 116 provides feedback to datacenter managers when problems are detected with servers, blades, processors, or applications in datacenter 100 or when network bandwidth or communications issues arise.

Embodiments disclosed herein reduce the costs associated with building and maintaining a graph or mapping of dependencies among the components of datacenter 100 and improves understanding of the impact on the system as a whole if one or more components fail in various ways. This approach minimizes to almost zero all manual operations and, as a consequence, minimizes the risk of human error. The problem may be split into two major parts. First, all dependencies in the system are discovered automatically and are always up-to-date. Second, a limited number of faults with variable parameters are injected automatically and on regular basis into all the dependencies and connections. Existing monitoring tools are used to measure the impact of the injected faults.

Service Directory

A directory or graph of all services in the system is automatically created and maintained to be always up-to-date. The service directory contains the graph of dependencies among the services and includes additional metadata about the services and connections. The directory identifies, for each service or role in the system, a role type and all endpoints in communication with the role. For example, the directory may identify services or roles such as storage, authentication, monitoring, etc. The types of communication include, for example, tight versus loose coupling, Hypertext Transfer Protocol (HTTP), HTTP Secure (HTTPS), or any other communication protocols. Additional information and metadata may be entered by the service owner, but the service directory is always current. The service directory is available to other applications for use. When dependencies change, the owner of the affected service may be notified.

Figure 2:
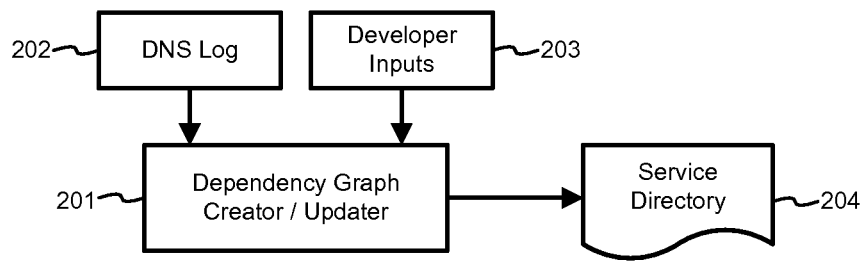
FIG. 2 is a block diagram illustrating the creation and updating of a directory of services according to one embodiment.

FIG. 2 is a block diagram illustrating the creation and updating of a directory of services according to one embodiment. Dependency graph creator/updater 201 receives input from DNS Log 202, which may be a log created by the DNS server that is resolving names and addresses for the roles in the system being analyzed. DNS Log 202 may identify, for example, the endpoints that are in communication with each role or service in the system. Each time a name is resolved, which indicates that a service or role is communicating with that endpoint, a monitoring agent on the DNS server may update the DNS Log 202. Additionally, service developers may provide inputs 203, such as known dependencies for a particular service or metadata about the service. Dependency graph creator/updater 201 creates service directory 204 available to external applications, such as a fault injection application.

Fault Injection System

A fault injection system is used to introduce a limited number of well-known faults into the system. The system's health monitoring service is used to detect the impact of these faults. The types of faults that can be injected include, for example, transport layer (OSI Reference Model Layer 4) faults, memory pressure, processor pressure, storage/hard drive pressure, VM restart, and VM shut down. Those faults are injected on a regular basis with various parameters into the dependencies and connections discovered by the services directory.

Minimalistic monitoring catches internal Service Level Agreement (SLA) violations and is used to detect the impact from the injected faults. The injection may be performed at all levels of dependencies, which is usually missed in current tools because the full graph of dependencies does not stay up-to-date and is almost never known for complex systems.

Using the suggested approach, it is expected that it would require just a few hours for on-boarding and configuring the service directory and fault injection system. Once this is done, the engineers that develop and run the system will have a clear and trustworthy picture of system dependencies and also the level of resilience and availability for the system. The service may be applied in any environment, including private and public clouds services, datacenters, and services running on-premises.

Figure 3:
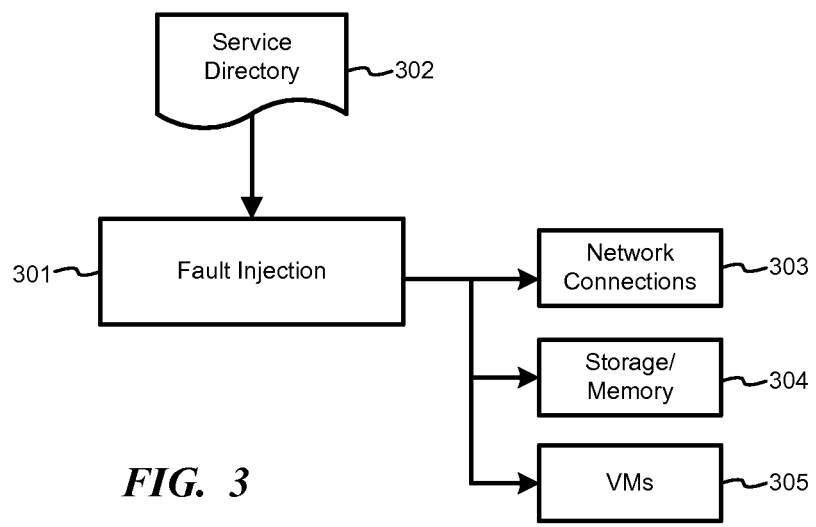
FIG. 3 is a block diagram illustrating fault injection according to one embodiment.

FIG. 3 is a block diagram illustrating fault injection according to one embodiment. System faults are applied by fault injection service 301. The type of faults to be injected and the timing of the fault injection are selected based upon service directory 302. The service directory provides a list of roles and all of their respective dependencies, including all endpoints that interact with each role. Using this information, different faults are injected into the system.

In one embodiment, two main categories of faults are injected. One category relates to network connections, whereby faults are introduced by disconnecting or delaying communications 303 between the role and endpoints selected from the service directory. Another category relates to role instances, whereby faults are injected based upon the type of role instance. These faults are specific to the role type, such as by injecting memory pressure 304, processor pressure 305, etc. The faults are injected on the role instance or for the role instance or on communication links that the role depends upon.

For example, memory pressure may be applied to role instances to remove 80% of memory for 50% of the role instances. Accordingly, fault injection 301 reduces the available memory by 80% for half of the selected role instances. The health monitoring service then detects the results of the fault and the role is evaluated for whether it is resilient, does it correctly detect the problem, does it have correct mitigation of the problem, etc.

Faults may be injected against roles in several ways. Different strategies may be used to inject faults for different types of roles. For example, faults may be injected in a deterministic, stochastic, or guided manner.

Deterministic fault injection involves injecting known faults with known fault parameters. For example, a network fault may be injected as a preselected delay in milliseconds for network communications, or a processor pressure fault may be injected as a preselected loading on a known number of processors (e.g., 80% loading).

Stochastic fault injection involves injecting a random number of faults against a random number of roles.

Guided fault injection involves injecting a selected fault against a selected number of components or instances and then steadily increasing the scope of the fault (e.g., increasing the number of components, number of roles, amount of pressure, amount of delay, etc.) until failure is detected. For example, a processor fault may be injected wherein 50% processor pressure is applied to a single machine and then the number of affected machines is steadily increased to 2, 4, 8, . . . machines until failure is detected. In such guided or deterministic fault injection, the number of affected roles or machines, amount of pressure, or other parameter is steadily increased until a breaking point for the targeted service or role is identified. Furthermore, as the breaking point is approached and finally met, the service's reaction to the fault can be observed (i.e., how the fault is identified, and mitigated).

Figure 4:
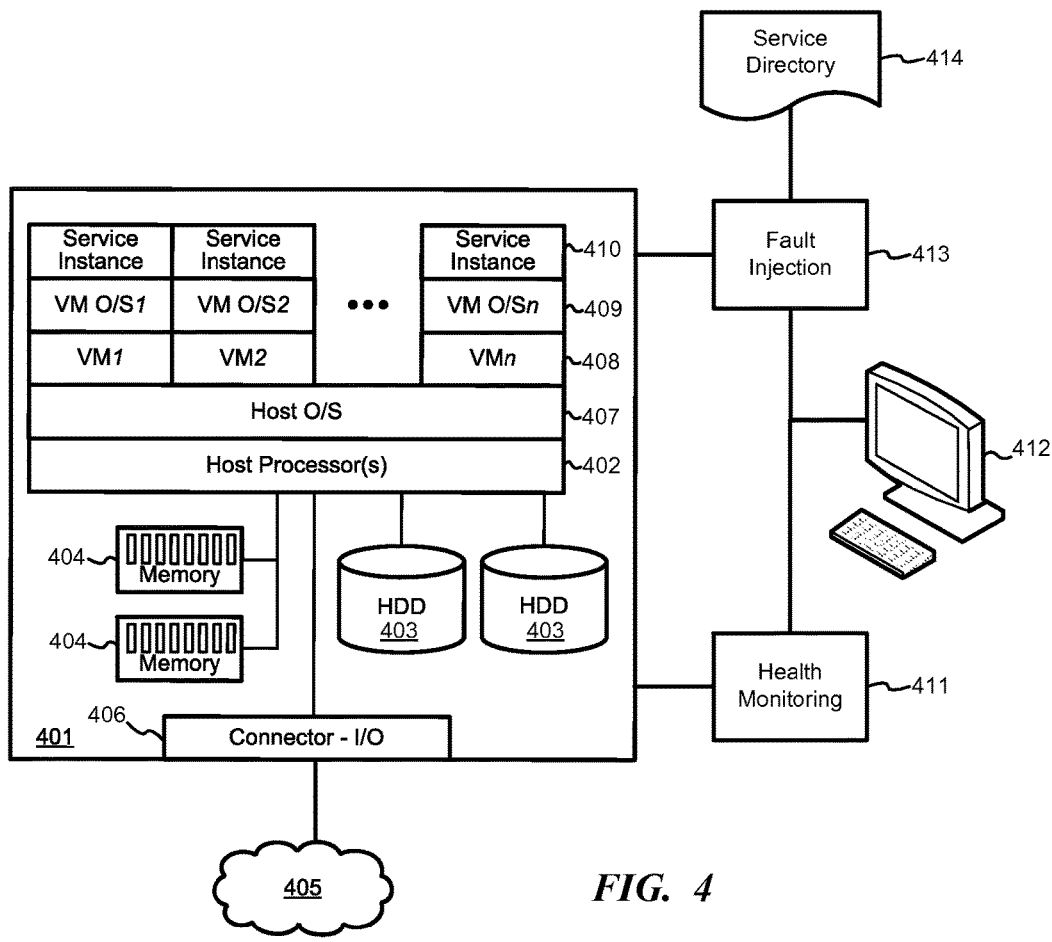
FIG. 4 is a simplified diagram of a system for testing the resiliency of a service, network, or computing system.

Referring to FIG. 4, a simplified diagram of a system for testing the resiliency of a service, network, or computing system is illustrated. A system 401 supports a number of host processors 402. System 401 may be an individual server or blade or may represent multiple distributed components. The host processors 402 access hard disk drive (HDD) storage 403 and Random Access Memory (RAM) 404 as needed to read/write data and software instructions. System 401 may communicate with other components via network 405 through input/output (I/O) connector 406. Network 405 may be any public or private network, such as the Internet, an intranet, Wide Area Network (WAN), Local Area Network (LAN), or the like.

Host operating system (O/S) 407 runs on host processors 402 and support VMs 408 running VM O/S 409. One or more instances of a service 410 run on the VMs 408. The service instances 410 may be in communication with related service instances 410 or other services (not shown) running on other VMs 408 or on remote servers accessed via network 405.

Health monitoring manager 411 is an application that is configured to observe the operation of system 401 and reports operational status information to users, such as a service provider, tenant, or customer, via terminal 412. Fault-injection manager 413 is an application that injects faults into system 401. Fault-injection manager 413 may use service directory 414 to determine which faults to inject. Terminal 412 may provide an interface to fault-injection manager 413 for monitoring and/or configuration of the faults being injected into system 401. Health monitoring manager 411 and/or fault-injection manager 413 may be services running on system 401 or on a separate component.

Health monitoring manager 411 may be, for example, an incident management system that detects failures in system 401. Upon detection of a failure, the incident management system may raise an alert on terminal 413, which may become an incident. When failures are observed and a designated incident level is reached, the fault injection may be stopped so that the service provider may investigate the failure and correct the system and/or the service's response to the fault.

System 401 may be a test environment that has the same hardware and service dependencies that would be found in a live system. A service's reaction to fault injection is evaluated in the test environment prior to introduction of the service on a live system. Alternatively, system 401 may represent a test slice of a production environment that has been isolated for service evaluation and that does not support live traffic.

Using the service directory 414, after observing a failure in one service, the service provider may identify other services having a dependency on, or a connection to, the failed service. This allows the service provider to determine how other services are affected by a particular service's failure. The directory of services provides guidance as to which other services may be affected by the particular service's failure. The service directory provides a directory of dependencies. Using this directory, the impact of a failure may be assessed at multiple levels. For example, a fault can be verified to have a cascading impact across multiple levels of dependencies as identified in the directory of dependencies.

When faults are injected into the system, glitches or faults are detected. The glitches may rise to the level of an error if they are persistent enough or large enough. If the glitch does become an error, then the system will attempt to handle the error. If the error is not handled properly or is not resolved, then it will become a failure, which is an unexpected behavior of the system or service. The faults that are injected into the system by fault-injection manager 413 are expected to become failures so that the breaking point of the service can be identified. The purposed of the health monitoring manager 411 is to identify such failures when the system misbehaves or has an outage.

Figure 5:
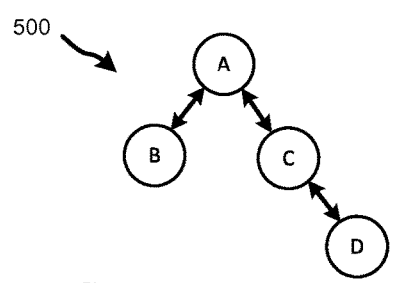
FIG. 5 illustrates an example graph of service dependencies.

FIG. 5 illustrates an example graph of service dependencies 500. Service A depends upon both services B and C. Service C depends upon service D, which means that service A is indirectly dependent upon service D. Services A-D may be running on various host processors 402 in system 401. For example, service A may be a VM service that depends upon a communication service B and a storage service C. Storage service C may further depend upon a cache service D. Service dependencies 500 among roles A-D may be determined and mapped based upon DNS calls to resolve names and addresses for calls among these roles.

When faults are injected into the system, service D may eventually fail, which will be detected by health monitoring manager 411. Upon detection of the failure, fault-injection manager 413 would cease injecting the fault so that the impact of the failure can be evaluated. The failure of service D would affect service C, but not service B. For example, if a cache service D failed, then the storage service C would be affected, but communication service B would not be affected. In directly, VM service A would also be affected by the failure of service D. Using the service directory mapping, the impact of a service D failure on other services A-C, i.e., a cascading failure across multiple dependency levels, can be determined.

Figure 6:
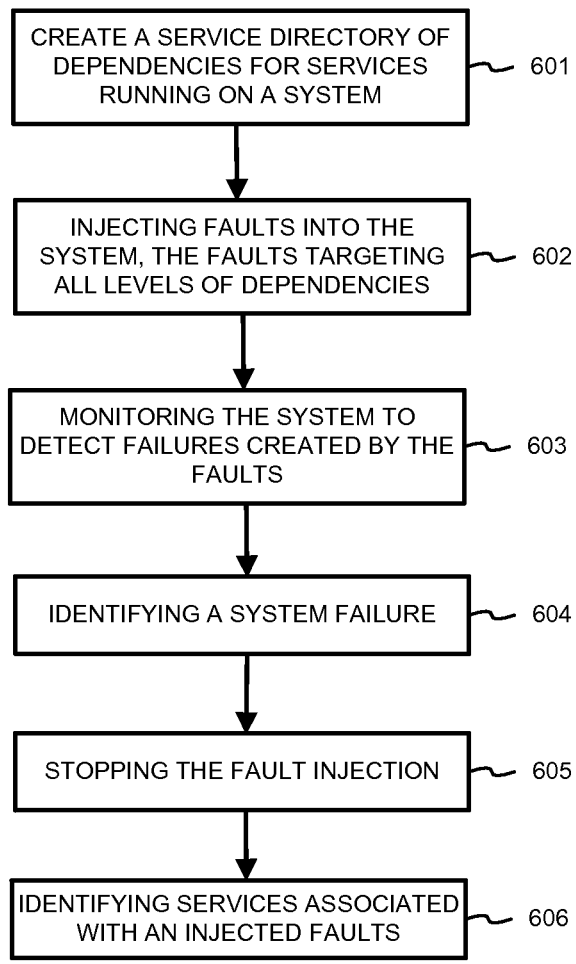
FIG. 6 is a flowchart illustrating a method for evaluating the resiliency of a system.

FIG. 6 is a flowchart illustrating a method for evaluating the resiliency of a system. In step 601, a service directory of dependencies is created for services running on a system, wherein instances of a first service are dependent upon instances of a second service. The directory of dependencies further comprising metadata associated with connections between the services. In step 602, faults are injected into the system. The faults are selected to target all levels of the dependencies in the system. The injected faults may be selected from a limited set of faults, including, for example, transport layer faults, memory pressure, processor pressure, storage pressure, virtual machine restart, and virtual machine shut down. The faults may be injected in a guided manner, wherein the scope of the faults is increased in steps over time to identify a failure point in the system. The injected faults may be associated with communications between dependent services or may be directed to role instances, for example.

In step 603, the system is monitored to detect failures created by the faults. In step 604, a system failure is identified. In step 605, the fault injection is stopped. In step 606, services associated with an injected fault are identified.

An example system comprises at least one processor running instances of two or more services, wherein instances of a first service are dependent upon instances of a second service. A fault-injection manager is configured to introduce a fault-inducing condition in the system. A health monitoring manager is configured to detect failures in the system. The fault-injection manager is further configured to identify the first service as vulnerable to the fault-inducing condition when the fault-inducing condition causes an instance of the second service to fail. Advantageously, the fault-injection management system improves the reliability of a monitored system by automatically identifying and testing all dependencies in the monitored system.

The system may further comprise a dependency graph manager configured to identify dependencies between service instances. The dependency graph manager may be configured to identify the dependencies among service instance using a directory name service, IP sniffing, packet sniffing, code instrumentation, or code tracing, for example. The names resolved in a directory name service may be stored to a directory name service log. The dependency graph manager may be configured to continuously update the service instance dependencies by analyzing names that have been resolved in the directory name service in real-time.

The fault-inducing conditions may be selected form transport layer faults, memory pressure, processor pressure, storage pressure, virtual machine restart, and virtual machine shut down, for example. The fault-injection manager may be configured to introduce the fault-inducing condition in a guided manner by increasing the fault-inducing condition until failure occurs.

An example method for testing the resiliency of a system comprises creating a service directory of dependencies for services running on a system, wherein instances of a first service are dependent upon instances of a second service, the directory of dependencies further comprises metadata associated with connections between the services; injecting faults in the system, the faults targeting all levels of the dependencies; and monitoring the system to detect failures created by the faults.

The injected faults may be selected from a limited set of faults. The limited set of faults may comprise, for example, transport layer faults, memory pressure, processor pressure, storage pressure, virtual machine restart, and virtual machine shut down.

The example method may further comprise monitoring a domain name service to identify resolved names for the services; and updating the service directory with additional dependencies using information about the resolved names.

The example method may further comprise injecting the faults in a guided manner, wherein the scope of the faults is increased in steps over time to identify a failure point in the system. The faults may be injected at all levels of the dependencies.

The example method may further comprise identifying a system failure; stopping the fault injection; and identifying services associated with an injected fault. The injected faults may be associated with communications between dependent services. The injected faults may be directed to role instances.

Another example system may comprising: a processor; and a memory containing a program, which, when executed on the processor, performs an operation for identifying an impact of system fault conditions, the operation comprises creating a service directory of dependencies for services running on the system, wherein instances of a first service are dependent upon instances of a second service, the directory of dependencies further comprising metadata associated with connections between the services; injecting faults in the system, the faults targeting all levels of the dependencies; and monitoring the system to detect failures created by the faults. The injected faults may be selected from transport layer faults, memory pressure, processor pressure, storage pressure, virtual machine restart, and virtual machine shut down. The operation may further comprise monitoring a domain name service to identify resolved names for the services; and updating the service directory with additional dependencies using information about the resolved names. The operation may further comprise injecting the faults in a guided manner, wherein the scope of the faults is increased in steps over time to identify a failure point in the system.

In some embodiments, the program may be on computer-readable media (CRM) that excludes propagated signals. Computer-readable media may be any available media that can be accessed by a computer and includes both volatile and nonvolatile media, and removable and non-removable media, but excludes propagated signals. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system, comprising:
   at least one processor running instances of two or more services, wherein instances of a first service are dependent upon instances of a second service;
   a fault-injection manager that introduces a fault-inducing condition in the system;
   a health monitoring manager that detects failures in the system; and
   wherein the fault-injection manager identifies the first service as vulnerable to the fault-inducing condition when the fault-inducing condition causes an instance of the second service to fail,
   wherein the fault-injection manager introduces the fault-inducing condition in a guided manner, wherein a scope of the fault-inducing condition is increased in steps over time.

2. The system of claim 1, further comprising:
   a dependency graph manager that identifies dependencies between service instances.

3. The system of claim 2, wherein the dependency graph manager identifies the dependencies among service instances using a directory name service, IP sniffing, packet sniffing, code instrumentation, or code tracing.

4. The system of claim 2, wherein names that have been resolved in a directory name service are stored to a directory name service log.

5. The system of claim 2, wherein the dependency graph manager continuously updates the service instance dependencies by analyzing names that have been resolved in a directory name service in real-time.

6. The system of claim 1, wherein the fault-inducing condition includes one or more of:
   transport layer faults, memory pressure, processor pressure, storage pressure, virtual machine restart, or virtual machine shut down.

7. The system of claim 1, wherein the fault-injection manager introduces the fault-inducing condition in a guided manner by increasing the fault-inducing condition until failure occurs.

8. A method, comprising:
   creating a service directory of dependencies for services running on a system, wherein instances of a first service are dependent upon instances of a second service, the directory of dependencies further comprising metadata associated with connections between the services;
   continuously updating the service directory with additional dependencies, based on results of monitoring of a domain name service resolving names for the services;
   injecting faults in the system, the faults targeting a plurality of levels of the dependencies; and
   monitoring the system to detect failures created by the faults.

9. The method of claim 8, wherein the injected faults are selected from a limited set of faults.

10. The method of claim 9, wherein the limited set of faults comprise:
    transport layer faults, memory pressure, processor pressure, storage pressure, virtual machine restart, and virtual machine shut down.

11. The method of claim 8, wherein:
    monitoring of a domain name service includes monitoring the domain name service to identify names that are resolved for the services, by the domain name service; and
    the service directory is updated with additional dependencies using information about the names that have been resolved.

12. The method of claim 8, further comprising:
    injecting the faults in a guided manner, wherein the scope of the faults is increased in steps over time to identify a failure point in the system.

13. The method of claim 8, wherein the faults are injected at a plurality of levels of the dependencies.

14. The method of claim 8, further comprising:
    identifying a system failure;
    stopping the fault injection; and
    identifying services associated with an injected fault.

15. The method of claim 8, wherein the injected faults are associated with communications between dependent services.

16. The method of claim 8, wherein the injected faults are directed to instances associated with roles.

17. A system, comprising: a processor; and
    a memory containing a program, which, when executed on the processor, performs an operation for identifying an impact of system fault conditions, the operation comprising:
    creating a service directory of dependencies for services running on the system, wherein instances of a first service are dependent upon instances of a second service, the directory of dependencies further comprising metadata associated with connections between the services;
    continuously updating the service directory with additional dependencies, based on results of monitoring of a domain name service resolving names for the services;
    injecting faults in the system, the faults targeting all levels of the dependencies; and
    monitoring the system to detect failures created by the faults.

18. The system of claim 17, wherein the injected faults include one or more of:
- transport layer faults, memory pressure, processor pressure, storage pressure, virtual machine restart, or virtual machine shut down.

19. The system of claim 17, wherein:
- monitoring of the domain name service includes monitoring the domain name service to identify names that are resolved for the services, by the domain name service; and
- the service directory is updated with additional dependencies using information about the names that have been resolved.

20. The system of claim 17, wherein the operation further comprises:
- injecting the faults in a guided manner, wherein the scope of the faults is increased in steps over time to identify a failure point in the system.

\* \* \* \* \*